US010966140B2

(12) United States Patent
Huang et al.

(10) Patent No.: US 10,966,140 B2
(45) Date of Patent: Mar. 30, 2021

(54) METHOD FOR DETECTING AND FILTERING OUT UNAUTHORIZED WIRELESS ACCESS POINT AND DEVICE USING THE METHOD

(71) Applicant: NANNING FUGUI PRECISION INDUSTRIAL CO., LTD., Nanning (CN)

(72) Inventors: Cheng-Yi Huang, New Taipei (TW); Chih-Wei Su, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 53 days.

(21) Appl. No.: 16/442,951

(22) Filed: Jun. 17, 2019

(65) Prior Publication Data
US 2020/0396671 A1   Dec. 17, 2020

(51) Int. Cl.
| | | |
|---|---|---|
| *H04W 48/02* | (2009.01) | |
| *H04B 17/318* | (2015.01) | |
| *H04W 64/00* | (2009.01) | |
| *H04W 12/06* | (2021.01) | |
| *H04W 84/12* | (2009.01) | |

(Continued)

(52) U.S. Cl.
CPC .......... *H04W 48/02* (2013.01); *H04B 17/318* (2015.01); *H04W 12/06* (2013.01); *H04W 64/003* (2013.01); *H04W 48/12* (2013.01); *H04W 84/12* (2013.01); *H04W 88/08* (2013.01)

(58) Field of Classification Search
CPC ... H04W 48/02; H04W 64/003; H04W 12/06; H04W 48/12; H04W 84/12; H04W 88/08; H04B 17/318
See application file for complete search history.

(56) References Cited

U.S. PATENT DOCUMENTS

| | | | |
|---|---|---|---|
| 7,970,894 B1* | 6/2011 | Patwardhan | H04W 12/12 709/224 |
| 9,003,527 B2* | 4/2015 | Bhagwat | H04W 12/0808 726/23 |
| 9,049,225 B2 | 6/2015 | Jana et al. | |

(Continued)

OTHER PUBLICATIONS

Chrisil Arackaparambil, On the Reliability of Wireless Fingerprinting using Clock skew, Mar. 2010, ACM, pp. 169-174. (Year: 2010).*

(Continued)

*Primary Examiner* — Steven H Nguyen
(74) *Attorney, Agent, or Firm* — ScienBiziP, P.C.

(57) ABSTRACT

A method for detecting and preventing the operation of a rogue access point (AP) by issuing deauthentication packets thereto includes receiving beacon packets of all wireless APs in a wireless network area, obtaining timestamps, and establishing a clock skew model for each wireless AP accordingly. Each clock skew model can be held abnormal according to a growth slope of the clock skew model, and the wireless AP corresponding to an abnormal clock offset model can be defined as a rogue AP. Position and distance range of the rogue AP can be established by RSSIs, and a specified authorized AP adjacent to the rogue AP can be selected and controlled to send deauthentication packets to the rogue AP. A device for detecting and restraining the rogue AP is also provided.

14 Claims, 5 Drawing Sheets

(51) Int. Cl.
*H04W 88/08* (2009.01)
*H04W 48/12* (2009.01)

(56) References Cited

U.S. PATENT DOCUMENTS

2008/0101283 A1* 5/2008 Calhoun ............... H04W 12/12
370/328
2011/0222421 A1* 9/2011 Jana .................. H04W 12/1202
370/252

OTHER PUBLICATIONS

Suman Jana, On Fast and Accurate Detection of Unauthorized Wireless Access Points Using Clock Skews, 2008, ACM, pp. 1-12. (Year: 2008).*
Swati Jadhav, Illegal Access Point Detection Using Clock Skews Method in Wireless LAN, 2014, IEEE, pp. 724-729. (Year: 2014).*

* cited by examiner

METHOD FOR DETECTING AND FILTERING OUT UNAUTHORIZED WIRELESS ACCESS POINT AND DEVICE USING THE METHOD

FIELD

The subject matter herein generally relates to wireless communications.

BACKGROUND

In a wireless network area, one or more wireless access points (APs) may join the wireless network area without permission. Such an AP without permission can be defined as a rogue AP. The rogue APs and wireless devices connected to the rogue APs occupy wireless channels of the wireless network area at the cost to authorized APs and innocent users of the wireless network area of low wireless throughput. An attacker may also steal user information by accessing the rogue AP.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
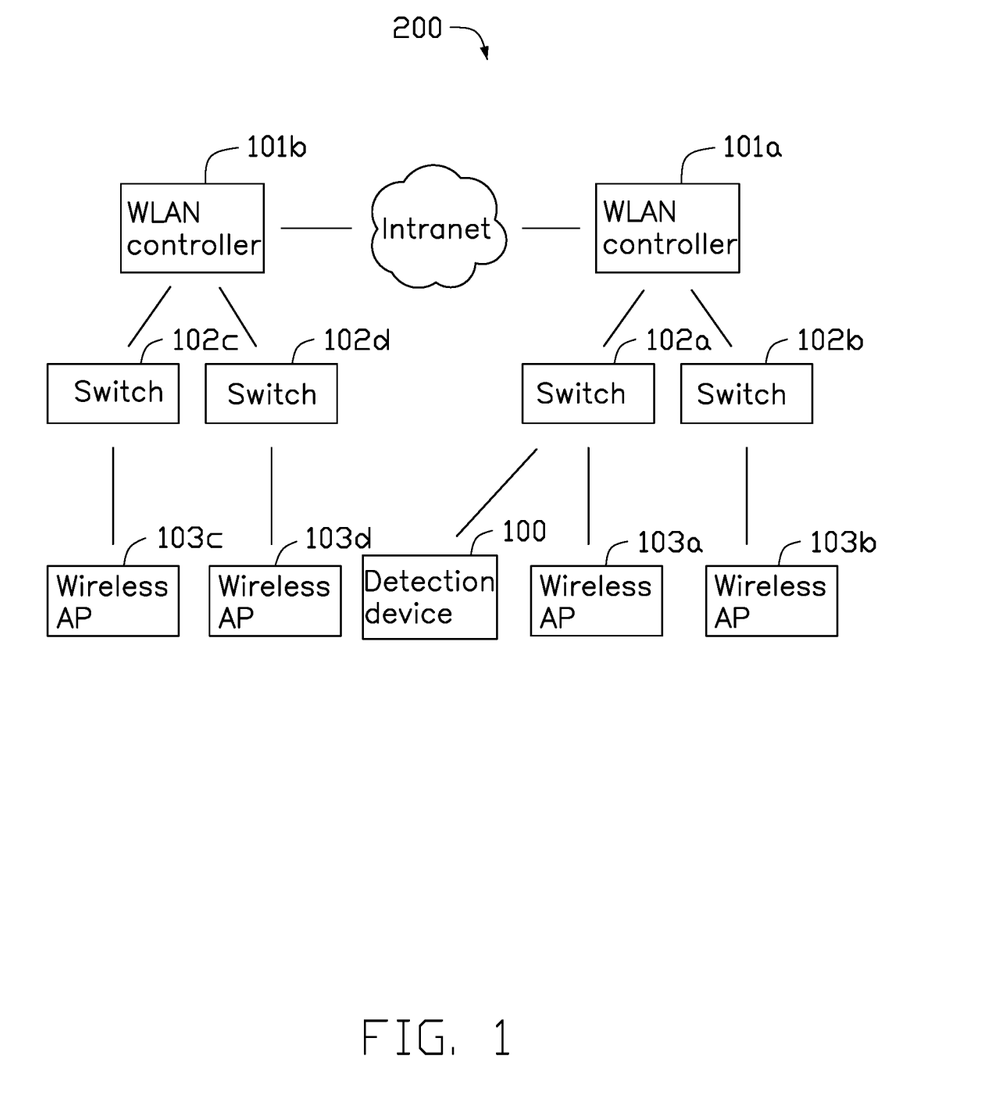
FIG. 1 is a block diagram of a detection device in its operating environment in one embodiment.

FIG. 1 illustrates a detection device 100 for detecting and preventing the operation of (restraining) one or more rogue access points (APs) in a wireless network area 200, in accordance with an embodiment. The detection device 100 can communicate in a wired or wireless manner with the wireless network area 200. For example, the detection device 100 can be connected to a switch of the wireless network area 200.

In one embodiment, the wireless network area 200 can be a wireless in a school or college, a LAN (local area network), an enterprise wireless LAN, or a home wireless LAN. The wireless network area 200 can comprise a plurality of WLAN (wireless local area network) controllers, a plurality of switches, and a plurality of APs. The AP can be a wireless router for example.

As shown in FIG. 1, the wireless network area 200 comprises two WLAN controllers 101a and 101b, four switches 102a, 102b, 102c, and 102d, and four wireless APs 103a, 103b, 103c, and 103d. The four wireless APs 103a, 103b, 103c, and 103d are authorized APs.

In one embodiment, each WLAN controller 101a and 101b can connect to one or more switches, and each of the switches 102a to 102d can connect to one or more APs.

Figure 2:
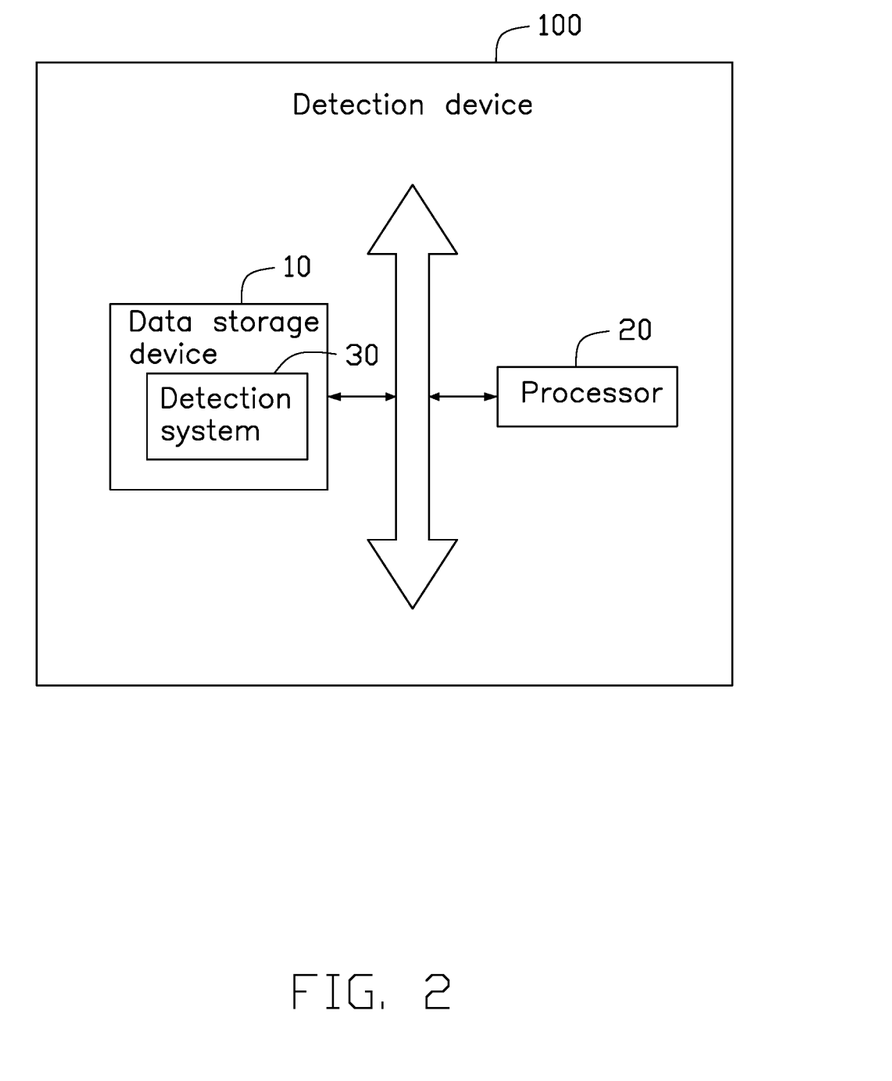
FIG. 2 is a block diagram of an embodiment of the detection device of FIG. 1.

FIG. 2 illustrates that the detection device 100 comprises at least one data storage device 10, at least one processor 20, and a detection system 30. The detection system 30 can determine whether the wireless network area 200 comprises one or more rogue APs, the detection system 30 can further restrain the one or more rogue APs from accessing the wireless network area 200.

Figure 3:
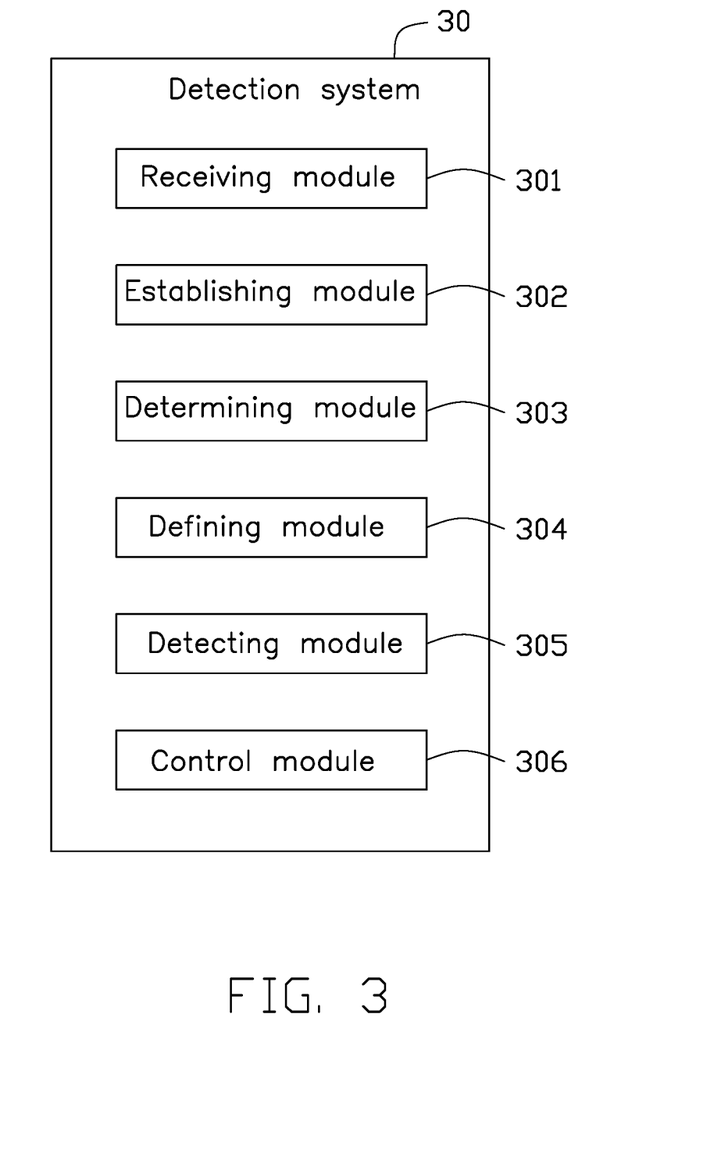
FIG. 3 is a block diagram of an embodiment of a detection system applied in the detection device of FIG. 1.

FIG. 3 illustrates that the detection system 30 comprises a plurality of modules, such as a receiving module 301, an establishing module 302, a determining module 303, a defining module 304, a detecting module 305, and a control module 306. The modules 301-306 may comprise one or more software programs in the form of computerized codes stored in the data storage device 10. The computerized codes may include instructions that can be executed by the processor 20 to provide functions for the modules 301-306.

In one embodiment, the data storage device 10 can be inside the detection device 100, or can be a separate external memory card, such as an SM card (Smart Media Card), an SD card (Secure Digital Card), or the like. The data storage device 10 can include various types of non-transitory computer-readable storage mediums. For example, the data storage device 10 can be an internal storage system, such as a flash memory, a random access memory (RAM) for temporary storage of information, and/or a read-only memory (ROM) for permanent storage of information. The data storage device 10 can also be an external storage system, such as a hard disk, a storage card, or a data storage medium. The processor 20 can be a central processing unit (CPU), a microprocessor, or other data processor chip that performs functions of the detection device 100.

The receiving module 301 can receive beacon packets of each wireless AP 103a to 103d in the wireless network area 200.

In one embodiment, each wireless AP 103a to 103d can periodically send out the beacon packets when operating. When the detection device 100 accesses the wireless network area 200, the receiving module 301 can receive the beacon packets of each wireless AP 103a to 103d. Each beacon packet comprises a timestamp, and the timestamp records a transmission time.

In one embodiment, the transmission time can be written into the beacon packet by a radio frequency (RF) chip of each wireless AP 103a to 103d. A clock of the wireless AP can be generated by an oscillator and a counter in each wireless AP 103a to 103d.

In one embodiment, multiple electronic devices with the same electronic components have different clock offsets. The clock offset may be caused by different oscillation frequency of an oscillator of each electronic device. The clock offset may become larger with the time increasing after the electronic device is turned on.

The establishing module 302 can obtain timestamps of the beacon packets and establish a clock skew model corresponding to each wireless AP 103a to 103d.

In one embodiment, each wireless AP 103a to 103d corresponds to a clock skew model, and the establishing module 302 can establish multiple clock skew models to correspond to the wireless APs 103a to 103d. The establishing module 302 can obtain each timestamp of the beacon packets to establish the clock skew model corresponding to each wireless AP 103a to 103d. For example, the receiving module 301 receives a plurality of beacon packets of the wireless AP 103a, the establishing module 302 obtains timestamps of each beacon packet and can establish the clock skew model corresponding to the wireless AP 103a.

For example, when the wireless AP 103b periodically sends out the beacon packets, the establishing module 302 obtains timestamps $t_0, t_1, t_2, \ldots, t_n$ of the beacon packets of the wireless AP 103b, where $t_0$ represents a timestamp at an initial time, and represents a timestamp at an n-th time. The establishing module 302 can calculate a clock offset value of timestamps of the wireless AP 103b at time intervals, and establish the clock skew model corresponding to the wireless AP 103b accordingly.

For example, the establishing module 302 calculates a clock offset value between a timestamp at i-th time and a timestamp at (i+1)-th time, i can be 0~(n−1).

In one embodiment, the clock skew model can be shown as a point chart in a XY coordinate system, X axis represents timestamps and Y axis represents clock offset values.

The determining module 303 can determine whether a clock offset model is abnormal according to a growth slope of each clock skew model.

In one embodiment, the growth slope of each clock skew model can be calculated by formula $Y_i = b_0 + b_1 * X_i$, wherein $Y_i$ represents a clock offset value between a timestamp at a i-th time $t_i$ and a timestamp at a start time $t_0$, $b_0$ represents an initial clock offset, $b_1$ represents a growth slope, and $X_i$ represents a different value between the i-th time $t_i$ and the start time $t_0$, $X_i = t_i - t_0$. When $X_i$ and $Y_i$ are known values, a least square method can be used to calculate values of $b_0$ and $b_1$.

In one embodiment, the detection device 100 can prestore the growth slopes of the clock offset models of the authorized APs 103a to 103d for future use in the wireless networking area 200. The determining module 303 can continuously update the clock offset model of each wireless AP and compare the instant growth slope of each clock offset model with the growth slope of each authorized AP 103a to 103d. If a growth slope is discovered which is unknown at the current time, the determining module 303 can determine that a clock offset model corresponding to the newly-discovered unknown growth slope is abnormal.

For example, the clock offset models established at a time $t_1$ correspond to authorized APs, and each clock offset model has a growth slope. The determining module 303 can compare growth slopes corresponding to clock offset models established at a time $t_i$ with growth slopes corresponding to the clock offset models established at the time $t_1$, and thus determine whether one or more unknown growth slopes are occurring at the time $t_i$. No unknown growth slopes appear at the time $t_1$. If one or more unknown growth slopes occur at the time $t_i$, the determining module 303 can determine that lock offset model(s) corresponding to the one or more unknown growth slopes are clock offset models which are abnormal.

In one embodiment, the wireless network area 200 comprises four authorized APs 103a to 103d. Thus, for example, a growth slope corresponding to the authorized AP 103a is b11, a growth slope corresponding to the authorized AP 103b is b12, a growth slope corresponding to the authorized AP 103c is b13, and a growth slope corresponding to the authorized AP 103d is b14. If a growth slope b15 appears and is calculated at the time $t_i$, the determining module 303 can determine that growth slope b15 is an unknown growth slope. Thus, the determining module 303 can determine that a clock offset model corresponding to the growth slope b15 is abnormal.

The defining module 304 can define a wireless AP with an abnormal clock offset model as the rogue AP.

Figure 4:
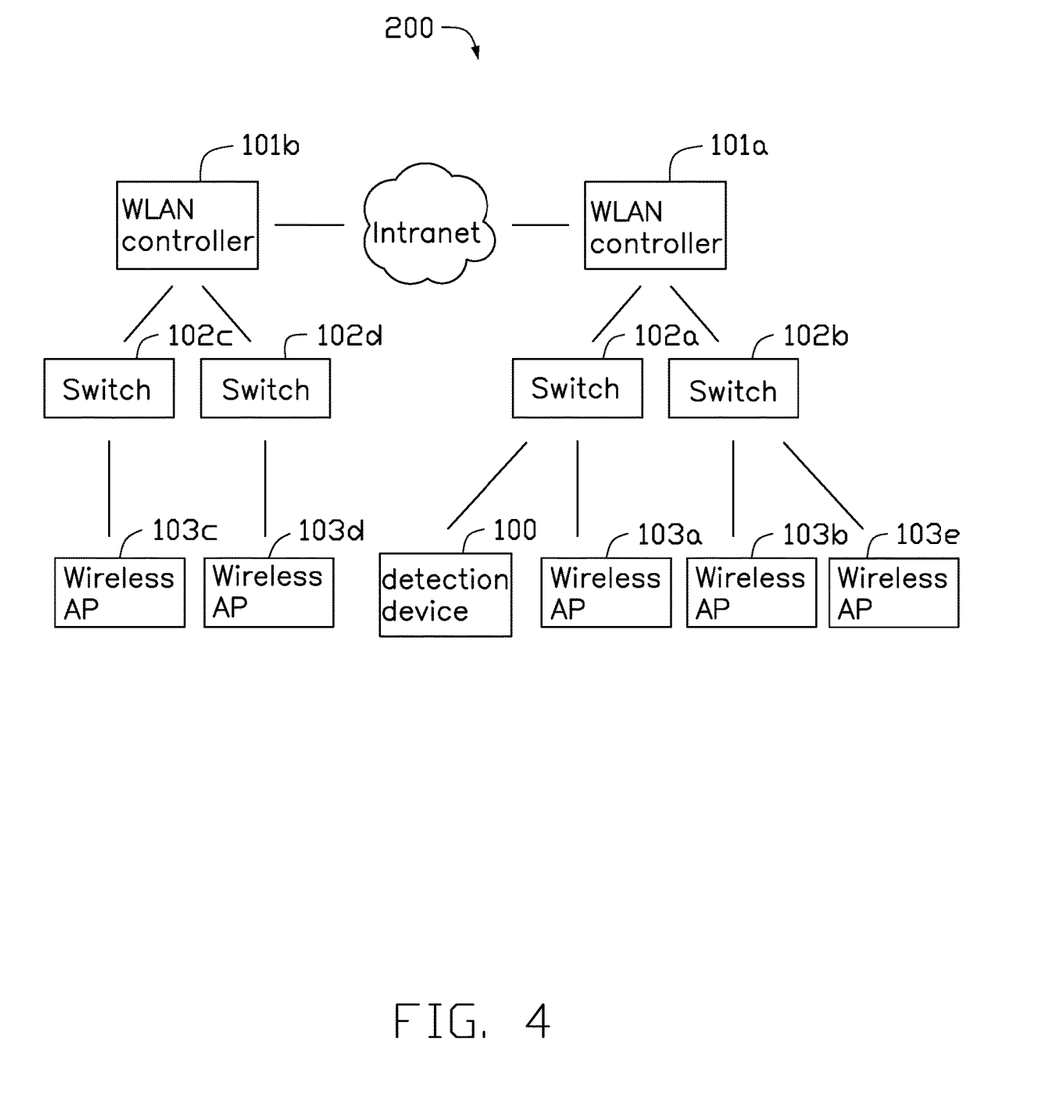
FIG. 4 is a diagram of a detection device in its operating environment in another embodiment.

In one embodiment, when an abnormal clock offset model is detected, the defining module 304 can define the wireless AP corresponding to such abnormal clock offset model as the rogue AP. The rogue AP is a wireless AP that is not authorized by a management of the wireless networking area 200. For example, a wireless AP established by a local employee can access the wireless network area 200 without permission, or a wireless AP established by an intruder can be accessing the wireless network area 200. Wireless AP 103e shown in FIG. 4 is the rogue AP for example. The wireless AP 103e is accessing the wireless network area 200 without permission.

In one embodiment, when the defining module 304 defines an abnormal wireless AP as the rogue AP, warning information about the rogue AP can be output by the detection device 100, or a notification can be sent to a management workstation of the wireless network area 200.

The detecting module 305 can detect a position and distance or range of distance of the rogue AP 103e.

In one embodiment, the detecting module 305 can detect a received signal strength indicator (RSSI) of the rogue AP 103e through authorized APs 103a to 103d, and determine the position and range of the rogue AP 103e accordingly.

In one embodiment, the nearer that an authorized AP is to the rogue AP 103e, the greater the number of the RSSIs that can be detected by the authorized AP. In the wireless network area 200, an installation location of each authorized AP 103a to 103d can be pre-obtained, and the detection module 305 can detect the position or position range of the rogue AP 103e according to the installation location of each authorized AP 103a to 103d and the RSSIs detected by each of the authorized APs 103a to 103d.

The control module 306 can select and control a specified authorized AP that is adjacent to the rogue AP 103e to send deauthentication packets to the rogue AP 103e which effectively prevent the rogue AP 103e from accessing the wireless network area 200.

In one embodiment, the control module 306 can compare the RSSIs detected by each authorized AP 103a to 103d, and define an authorized AP corresponding to the maximum RSSI as the specified authorized AP. For example, the authorized AP 103a can detect an RSSI of the rogue AP 103e as −90 dBm, the authorized AP 103b can detect an RSSI of the rogue AP 103e as −95 dBm, the authorized AP 103c can detect an RSSI of the rogue AP 103e as −100 dBm, and the authorized AP 103d can detect an RSSI of the rogue AP 103e as −80 dBm. The authorized AP 103d is determined to be specified authorized AP. The control module 306 selects and controls the authorized AP 103d to send the deauthentication packets to the rogue AP 103e to restrain the rogue AP 103e. Therefore, the detection device 100 can insulate itself against the rogue AP 103e for its own benefit and that of other users before the rogue AP 103e is actually removed from the wireless network area 200.

In one embodiment, when the authorized AP 103d is selected to send the deauthentication packets to the rogue AP 103e, the authorized AP 103d also needs to provide wireless access services to other wireless clients connected to the authorized AP 103d. To avoid a service interruption while the authorized AP 103d is sending the deauthentication packets to the rogue AP 103e, the control module 306 further controls the authorized AP 103d to send the deauthentication packets to the rogue AP 103e based on a channel utilization of the authorized AP 103d. The channel utilization of the authorized AP 103d can be calculated by formula $c_1 = a_1/a_2$, where $c_1$ represents a channel utilization, $a_1$ represents busy channel time during an observation time period, and $a_2$ represents a transmission time of beacon packets which are continuously transmitted during the observation time period.

In one embodiment, the control module 306 can adaptively control a channel dwell time of the authorized AP 103d to send the deauthentication packets to the rogue AP 103e based on the channel utilization of the authorized AP 103d. The channel utilization of the authorized AP 103d can represent a channel state relative to a wireless service of the authorized AP 103d and the wireless clients accessing the authorized AP 103d as their AP.

In one embodiment, when the channel utilization of the authorized AP 103d is less than a predetermined value, the control module 306 sets a dwell time for the authorized AP 103d being switched to a wireless channel of the rogue AP 103e as a first predetermined time. The authorized AP 103d is controlled to send the deauthentication packets to the rogue AP 103e based on the first predetermined time. When the channel utilization of the authorized AP 103d is greater than the predetermined value, the control module 306 can set the dwell time for the authorized AP 103d being switched to the wireless channel of the rogue AP 103e as a second predetermined time, and the authorized AP 103d is controlled to send the deauthentication packets to the rogue AP 103e accordingly.

In one embodiment, the first predetermined time is greater than the second predetermined time. The predetermined value, the first predetermined time, and the second predetermined time can be set and adjusted according to usage scenarios of the detection device 100.

For example, when the channel utilization of the authorized AP 103d is less than thirty percent, the control module 306 can set the dwell time for the authorized AP 103d being switched to the wireless channel of the rogue AP 103e as 200 milliseconds. When the channel utilization of the authorized AP 103d is greater than thirty percent, the control module 306 can set the dwell time for the authorized AP 103d being switched to the wireless channel of the rogue AP 103e as 100 milliseconds.

Figure 5:
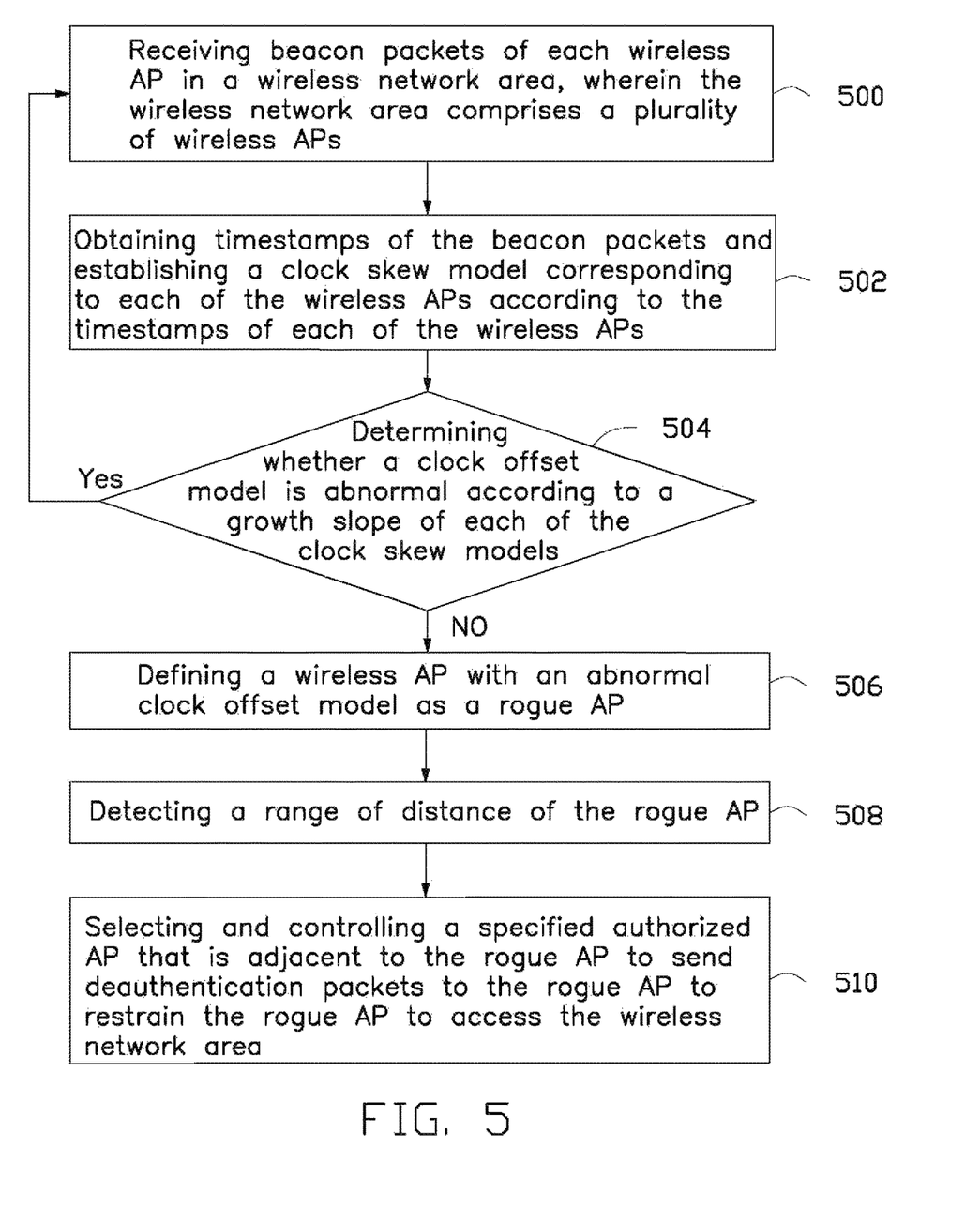
FIG. 5 is a flow diagram of a method for detecting and restraining rogue access points in one embodiment.

FIG. 5 illustrates one exemplary embodiment of a method for detecting and restraining rogue APs. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each block shown in FIG. 5 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 500.

In block 500, receiving beacon packets of each wireless AP 103a to 13d in the wireless network area 200.

In block 502, obtaining timestamps of the beacon packets and establishing a clock skew model corresponding to each of the wireless APs 103a to 103d according to the timestamps of each of the wireless APs 103a to 103d.

In block 504, determining whether a clock offset model is abnormal according to a growth slope of each of the clock skew models.

In block 506, defining a wireless AP 103e with an abnormal clock offset model as a rogue AP.

In block 508, detecting a range of distance of the rogue AP 103e.

In block 510, selecting and controlling a specified authorized AP that is adjacent to the rogue AP 103e to send deauthentication packets to the rogue AP 103e to restrain the rogue AP 103e to access the wireless network area 200.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for detecting and restraining rogue access points (APs), the method operated in a detection device, the detection device comprising a processor and a storage device, the method comprising:

receiving, by the processor, beacon packets of each wireless AP in a wireless network area, wherein the wireless network area comprises a plurality of wireless APs;

obtaining timestamps of the beacon packets and establishing a clock skew model corresponding to each of the wireless APs according to the timestamps of each of the wireless APs, by the processor;

determining, by the processor, whether a clock offset model is abnormal according to a growth slope of each of the clock skew models;

defining, by the processor, a wireless AP with an abnormal clock offset model as a rogue AP;

detecting, by the processor, a range of distance of the rogue AP; and selecting and controlling, by the processor, a specified authorized AP that is adjacent to the rogue AP to send deauthentication packets to the rogue AP to restrain the rogue AP to access the wireless network area;

wherein the specified authorized AP is selected from the wireless Aps; and wherein the block of controlling the specified authorized AP to send deauthentication packets to the rogue AP comprises:

controlling the specified authorized AP to send the deauthentication packets to the rogue AP based on a channel utilization of the specified authorized AP;

setting a dwell time for the specified authorized AP being switched to a wireless channel of the rogue AP as a first predetermined time when the channel utilization of the specified authorized AP is less than a predetermined value;

controlling the specified authorized AP to send the deauthentication packets to the rogue AP based on the first predetermined time;

setting the dwell time for the specified authorized AP being switched to the wireless channel of the rogue AP as a second predetermined time when the channel utilization of the specified authorized AP is greater than the predetermined value;

controlling the specified authorized AP to send the deauthentication packets to the rogue AP based on the second predetermined time; and wherein the first predetermined time is greater than the second predetermined time.

2. The method of claim 1, wherein the block of establishing a clock skew model corresponding to each of the wireless APs according to the timestamps of each of the wireless APs comprises:

calculating a clock offset value of timestamps of a first wireless AP at time intervals; and establishing a clock skew model corresponding to the first wireless AP according to the clock offset value of the timestamps.

3. The method of claim 1, wherein the growth slope of a clock skew model is calculated by formula:

Yi=b0+b1*Xi, wherein Yi represents a clock offset value between a timestamp at a i-th time and a timestamp at a start time, b0 represents an initial clock offset, b1 represents a growth slope, and Xi represents a different value between the i-th time and the start time.

4. The method of claim 1, wherein the block of determining whether a clock offset model is abnormal according to the growth slope of each of the clock skew models comprises:

comparing growth slopes corresponding to clock offset models established at a i-th time with growth slopes corresponding to the clock offset models of each authorized AP to determine whether an unknown growth slope is occurring at the i-th time.

5. The method of claim 4, wherein the block of defining a wireless AP with an abnormal clock offset model as the rogue AP comprises:

defining a clock offset model corresponding to the unknown growth slope as the abnormal clock offset model; and defining a wireless AP corresponding to the abnormal clock offset model as the rogue AP.

6. The method of claim 1, wherein the block of detecting a range of distance of the rogue AP comprises:

detecting a received signal strength indicator (RSSI) of the rogue AP through each authorized AP; and determining the range of distance of the rogue AP according to detection results of the authorized APs.

7. The method of claim 6, further comprising:

comparing the RSSI of the rogue AP detected by each authorized AP, and defining an authorized AP corresponding to the maximum RSSI as the specified authorized AP.

8. A detection device comprising:

at least one processor;

a storage device; and one or more programs that are stored in the storage and executed by the at least one processor, the one or more programs comprising instructions for:

receiving, by the processor, beacon packets of each wireless AP in a wireless network area, wherein the wireless network area comprises a plurality of wireless APs;

obtaining timestamps of the beacon packets and establishing a clock skew model corresponding to each of the wireless APs according to the timestamps of each of the wireless APs, by the processor;

determining, by the processor, whether a clock offset model is abnormal according to a growth slope of each of the clock skew models;

defining, by the processor, a wireless AP with an abnormal clock offset model as a rogue AP;

detecting, by the processor, a range of distance of the rogue AP; and selecting and controlling, by the processor, a specified authorized AP that is adjacent to the rogue AP to send deauthentication packets to the rogue AP to restrain the rogue AP to access the wireless network area;

wherein the specified authorized AP is selected from the wireless APs; and wherein the block of controlling the specified authorized AP to send deauthentication packets to the rogue AP comprises:

controlling the specified authorized AP to send the deauthentication packets to the rogue AP based on a channel utilization of the specified authorized AP;

setting a dwell time for the specified authorized AP being switched to a wireless channel of the rogue AP as a first predetermined time when the channel utilization of the specified authorized AP is less than a predetermined value;

controlling the specified authorized AP to send the deauthentication packets to the rogue AP based on the first predetermined time;

setting the dwell time for the specified authorized AP being switched to the wireless channel of the rogue AP as a second predetermined time when the channel utilization of the specified authorized AP is greater than the predetermined value;

controlling the specified authorized AP to send the deauthentication packets to the rogue AP based on the second predetermined time; and wherein the first predetermined time is greater than the second predetermined time.

9. The detection device of claim 8, wherein the instruction of establishing a clock skew model corresponding to each of the wireless APs according to the timestamps of each of the wireless APs comprises:

calculating a clock offset value of timestamps of a first wireless AP at time intervals; and establishing a clock skew model corresponding to the first wireless AP according to the clock offset value of the timestamps.

10. The detection device of claim 8, wherein the growth slope of a clock skew model is calculated by formula:

Yi=b0+b1*Xi, wherein Yi represents a clock offset value between a timestamp at a i-th time and a timestamp at a start time, b0 represents an initial clock offset, b1 represents a growth slope, and Xi represents a different value between the i-th time and the start time.

11. The detection device of claim 8, wherein the instruction of determining whether a clock offset model is abnormal according to the growth slope of each of the clock skew models comprises:
comparing growth slopes corresponding to clock offset models established at a i-th time with growth slopes corresponding to the clock offset models of each authorized AP to determine whether an unknown growth slope is occurring at the i-th time.

12. The detection device of claim 11, wherein the instruction of defining a wireless AP with an abnormal clock offset model as the rogue AP comprises:
defining a clock offset model corresponding to the unknown growth slope as the abnormal clock offset model; and
defining a wireless AP corresponding to the abnormal clock offset model as the rogue AP.

13. The detection device of claim 8, wherein the instruction of detecting a range of distance of the rogue AP comprises:
detecting a received signal strength indicator (RSSI) of the rogue AP through each authorized AP; and
determining the range of distance of the rogue AP according to detection results of the authorized APs.

14. The detection device of claim 13, wherein the one or more programs further comprises:
comparing the RSSI of the rogue AP detected by each authorized AP, and defining an authorized AP corresponding to the maximum RSSI as the specified authorized AP.

* * * * *